United States Patent [19]

Luckenbach

[11] 4,009,121
[45] Feb. 22, 1977

[54] METHOD OF TEMPERATURE CONTROL IN CATALYST REGENERATION

[75] Inventor: Edward C. Luckenbach, Mountainside, N.J.

[73] Assignee: Exxon Research and Engineering Company, Linden, N.J.

[22] Filed: Aug. 26, 1975

[21] Appl. No.: 607,764

[52] U.S. Cl. .................. 252/417; 23/288 B; 23/288 K; 23/288 L; 23/288 S; 122/4 D; 165/104 F; 208/159; 208/164
[51] Int. Cl.² ............... B01J 37/14; B01J 21/20; F27B 15/16
[58] Field of Search .......... 252/417; 208/159, 164; 23/288 B, 288 S, 288 K, 288 L; 165/104 F; 122/4 D

[56] References Cited

UNITED STATES PATENTS

| | | | |
|---|---|---|---|
| 2,735,744 | 2/1956 | Rex | 208/159 |
| 2,755,782 | 7/1956 | Campbell et al. | 23/288 S |
| 2,853,455 | 9/1958 | Campbell et al. | 252/417 |
| 3,862,898 | 1/1975 | Boyd et al. | 252/417 |

FOREIGN PATENTS OR APPLICATIONS 339,745   5/1972   U.S.S.R. ............. 23/288 S

Primary Examiner—Winston A. Douglas
Assistant Examiner—P. E. Konopka
Attorney, Agent, or Firm—Marthe L. Gibbons

[57] ABSTRACT

Steam coils having two different pressure levels are provided in a bed of carbon-contaminated catalyst undergoing regeneration by combustion with an oxygen-containing gas to control the temperature.

5 Claims, 1 Drawing Figure

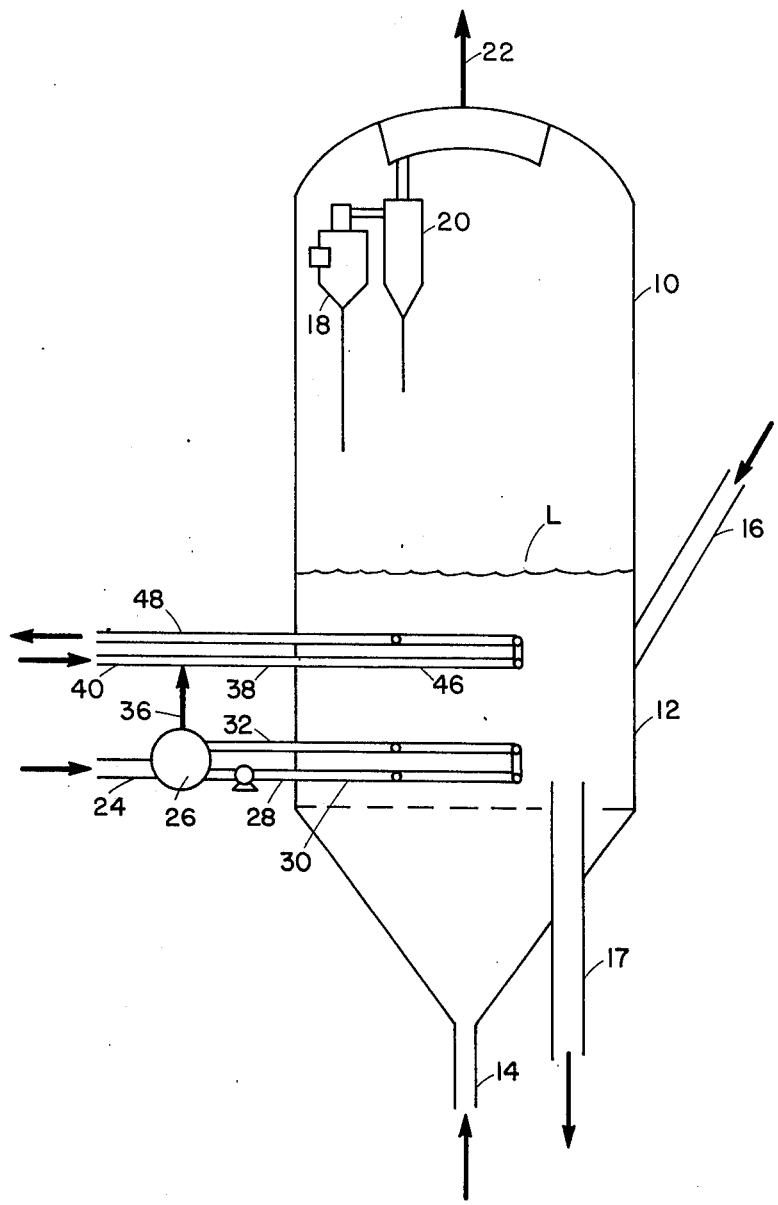

METHOD OF TEMPERATURE CONTROL IN CATALYST REGENERATION

BACKGROUND OF THE INVENTION

1. Field of the Invention

This invention relates to a method of temperature control in the catalyst regenerator of a fluid catalytic conversion process. More particularly, it relates to a method of removing heat from the bed of solid catalyst particles undergoing regeneration by combustion of carbonaceous deposits on the catalyst surface with an oxygen-containing gas in the regenerator of a fluid catalytic cracking unit.

2. Description of the Prior Art

On most fluid catalytic cracking units, it is necessary to remove heat at a controllable rate from the regenerator where spent catalyst is regenerated by burning off carbonaceous material with an oxygen-containing gas, such as air, in order to maintain equilibrium cracking conditions since the exothermic heat of regeneration imparted to the catalyst is transmitted to the fresh oil feed to the cracking reactor. It is also necessary to remove heat continuously to prevent undue regeneration temperature levels tending to sinter or deactivate the catalyst by surface area reduction. When heavy hydrocarbon feeds, such as atmospheric residua, vacuum residua, and heavy crude oils are catalytically cracked, a greater amount of carbon deposits on the catalyst particles than in the cracking of feeds such as gas oil. When the spent catalyst from the catalytic cracking of such heavy hydrocarbon feeds is regenerated by combustion with an oxygen-containing gas in a regeneration vessel, the heat removal problem is further aggravated since more heat is released in the regenerator than that which can be utilized in the process.

Various methods have been proposed to remove heat from a regenerator. The heat removal has been accomplished by withdrawing a portion of the catalyst from the bed of catalyst in the regenerator and circulating it through a tubular waste heat boiler so as to cool it before returning it to the catalyst bed. It has also been proposed to install steam coils in the regenerator as a means of heat recovery and temperature control (see, for example, U.S. Pat. No. 2,853,455; U.S. Pat. No. 2,926,143; U.S. Pat. No. 2,777,804; U.S. Pat. No. 3,886,060).

A disadvantage of using steam coils in a bed of catalyst undergoing regeneration is that the coils cannot be allowed to go to dryness since the temperature of the metal increases greatly from the wet to the dry zone. This causes severe thermal stresses in the steam coil and frequent metal failures. Therefore, the coil is usually made to operate either fully wet or fully dry.

When the coil is made to operate fully wet, the amount of heat that can be removed from the process cannot be varied to any great extent at normal pressure levels. If pressures were raised to critical or above, there could be considerable variation, but this pressure is too high to be considered feasible from an economic standpoint. Raising the pressure level from, for example, 150 to 650 pounds per square inch gauge (psig) would raise the water temperature in the coil from 366° to 499° F. This would vary steam production in a 1,250° F. bed by only 15 percent, which is not adequate for control. When the coil is operated dry, it means that steam is merely being superheated in the coil and that an external boiler is required to generate the steam which is subsequently passed into the coil.

It has now been found that the above-stated disadvantages can be minimized by utilizing, in a regenerator bed, a system of steam coils having two different pressures. One steam coil is maintained internally wet, whereas the second steam coil is maintained internally dry.

SUMMARY OF THE INVENTION

In accordance with the invention, there is provided a method for removing heat from a bed of fluidized solid catalyst particles undergoing regeneration in a regenerator of a fluid catalytic conversion unit wherein excess heat is liberated by combustion of carbonaceous deposits from the catalyst surface with an oxygen-containing gas, which comprises the steps of generating steam in a first tubular coil located in said bed of fluidized catalyst by indirect heat exchange between water and said bed of fluidized catalyst undergoing regeneration; maintaining the pressure in said first tubular coil such as to maintain the inner surface of said tubular coil essentially wet; injecting water drops into the steam effluent of said first tubular coil and introducing the resulting mixture of steam and water drops into a second tubular coil located in said bed of fluidized solid catalyst particles, said second tubular coil being maintained at a lower pressure than said first tubular coil, said lower pressure being such as to maintain the inner surface of said second tubular coil essentially dry.

BRIEF DESCRIPTION OF THE DRAWING

The drawing illustrates in schematic form a suitable apparatus for carrying out a preferred embodiment of the invention.

DESCRIPTION OF THE PREFERRED EMBODIMENT

Referring to the drawing, a regenerator 10 contains a bed 12 having a level L of fluidized catalyst particles having carbonaceous deposits thereon which are undergoing regeneration by combustion of the carbonaceous deposits with an oxygen-containing gas such as air introduced by line 14. Spent catalyst is introduced into bed 12 by line 16 and regenerated catalyst is removed from the regenerator by line 17. Combustion gas is evolved from the regeneration zone and entrained catalyst particles pass through cyclones 18 and 20 where the entrained particles are removed and returned to the regeneration bed via cyclone diplegs while the combustion gases are removed from the regenerator by line 22. The fluidized regeneration bed for regeneration of catalytic cracking catalysts is generally maintained at a temperature ranging from about 1,200° to about 1,400° F. The reaction between the carbonaceous deposits and the oxygen-containing gas is exothermic. Since more heat is evolved than that which is desired to maintain process heat balance by circulation of the hot regenerated catalyst to the reaction zone, a method to remove excess heat is provided in the fluidized bed of catalyst particles undergoing regeneration. Water is introduced by line 24 into a drum 26 from which it is passed by conduit 28 into a first tubular coil 30 positioned in the fluidized regeneration bed 12 wherein the water will be converted to steam by indirect heat exchange with the heat of the fluidized bed of catalyst. Tubular coil 30 is operated at heat transfer conditions such that the coil will not be dry at any point in the coil. The heat transfer conditions can readily be calculated by one skilled in the art to provide the desired heat removal and wet conditions. The wet conditions in the coil can be maintained by providing a heat transfer surface small enough and a fluid circulation rate high enough and an adequate pressure in tubular coil 30.

The steam generated in tubular coil 30 is passed into a conduit 32 located externally of the regenerator into separation drum 26. The steam effluent is removed from drum 26 by line 36 and introduced into conduit 38. The pressure of the steam in line 36 is generally 20 to 50 psig higher than the pressure in line 38. Water by line 40 is passed into spraying means (not shown) which is connected to line 38. A common type of atomizing water spray nozzle can be used such as, for example, commercially available full jet spray nozzles or a conventional desuperheating water spray nozzle. Water is sprayed into the line axially so as to insure homogeneous steam/water droplet mixture.

The water is atomized into fine droplets which are injected into the steam which is carried by line 38. The mixture of steam having dispersed therein water droplets is introduced into a second tubular coil 46 located in the fluidized bed of catalyst undergoing regeneration.

Tubular coil 46 is maintained at a lower pressure than the actual pressure maintained in tubular coil 30 and under conditions such that tubular coil 46 will be essentially dry or at least such that there will be no sharp interface of wetness and dryness within the coil.

The amount of water injected as droplets into the steam carried in line 38 is adjusted to control the temperature of the fluidized solids bed to the desired level. Desirably, the quantity of steam from first coil 30 introduced into the second coil 46 will be at least 10 weight percent of the maximum steam producing capacity of the second coil. The effluent of coil 46 is removed from regenerator 10 by line 48 and, if desired, passed to the refinery steam system. Suitable operating conditions for the dual coil steam system of the present invention are summarized in the following table:

| Conditions | Ranges |
| --- | --- |
| Pressure in first tubular coil, psig | 50 to 800 |
| Pressure in second tubular, coil, psig | 20 to 650 |
| Total surface area of first tubular coil, ft.$^2$ | 100 to 5000 |
| Total surface area of second tubular coil, ft.$^2$ | 200 to 15000 |
| Water inlet rate to first tubular coil, lb./hr. | 5000 |
| Water inlet temperature to first tubular coil, °F. | 280 to 550 |
| Steam rate to second tubular coil, lb./hr. | 5000 |

The following example will further illustrate the method of the present invention.

EXAMPLE

Water at a rate of 23,800 lb/hr and 180° F. is fed to an external steam drum in the structure of a unit containing a regenerator vessel operating at about 1,250° F. internal temperature. A 535 sq. ft. surface tubular heat exchange coil is located in the regenerator bed. Water is pumped from the drum into the coil at a rate of about 142,500 lb/hr and a temperature of 387° F. The discharge of the coil is connected back to the same drum which operates at 200 psi gauge. The heat transfer coefficient of such a coil in boiling water service would be approximately 54 BTU/Hr/sq. ft/° F. and at a log mean temperature difference between the coil and the bed of 863° F., the heat transferred to the water would be 26 MBTU/Hr. This would result in boiling about 29,900 lb/hr of the water in the coil to steam. Some of this steam would be condensed in the drum as the 180° F. entering water is cooler than the water in the drum, 367° F. Thus, the net production of steam from the drum is 23,800 lb/hr. The 535 sq. ft. steam coil would be wet throughout since only a small portion of the water passing through the coil would be vaporized in the coil. Thus, the metal surface of the coil would not be subject to severe thermal stresses that occur at the interface where water would evaporate to dryness.

The steam from first drum would be depressured into a second steam coil also located in the regenerator bed. 180° Fahrenheit water at the rate of 50,800 lb/hr would be atomized into this steam flow by an axially located desuperheating nozzle or a pressure atomized spray nozzle so as to finely disperse the water into droplets which will be suspended in the steam stream. A full jet spray nozzle manufactured by the Water Cooling Corp. would be adequate. The water pressure to the nozzle would be at about 250 psig pressure so as to insure good atomization.

The second steam coil operates at an outlet pressure of 150 psig. In view of the high volumetric flow rate through the coil, the pressure drop through the coil would be about 20 psig. This coil would contain about 1,320 sq. ft. of surface inside the regenerator bed. The atomized water would be fully vaporized in the coil and heated to a temperature of about 480° F. The overall heat transfer coefficient in this coil would be about 52 BTU/Hr/sq. ft./° F. and the log mean temperature difference would be 816° F.

The first coil would remove about 25 MBTU/Hr of heat from the bed. The second coil would remove an additional 58 MBTU/Hr for a total duty of 83 MBTU/Hr.

If it is desirable to reduce the amount of heat removed from the vessel, the water rate to the second coil may be reduced. In the extreme, if no water is injected, the coil outlet temperature would rise to 1,247° F. and only 11 MBTU/Hr would be removed by the 23,800 lb/hr of steam flowing through this coil. In fact, the steam could also be fully cut out since the coil is mechanically and metallurgically designed for bed temperatures. Thus, the heat removal from the vessel may be varied from 83 to 25 MBTU/Hr. The surface of the second coil is not wetted with a water film so that thermal shock is no problem; and the water rate can be varied in this manner.

The pressure in the steam coils can be increased to 650 psig or higher if the higher pressure steam fits into the utility system of the refinery.

What is claimed is:

1. A method for removing heat from a bed of fluidized solid catalyst particles undergoing regeneration in a regenerator of a fluid catalytic conversion unit wherein excess heat is liberated by combustion of carbonaceous deposits from the catalyst surface with an oxygen-containing gas, which comprises the steps of generating steam in a first tubular coil located in said bed of fluidized catalyst by indirect heat exchange between water and said bed of fluidized catalyst undergoing regeneration; maintaining the pressure in said first tubular coil such as to maintain the inner surface of said first tubular coil essentially wet, the pressure in said first tubular coil ranging from about 50 to about 800 psig and the total surface area of said first tubular coil ranging from about 100 square feet to about 5,000 square feet; injecting water drops into the steam effluent of said first tubular coil, and introducing the resulting mixture of steam and water drops into a second tubular coil located in said bed of fluidized solid catalyst particles, said second tubular coil being maintained at a lower pressure than said first tubular coil, said lower pressure being such as to maintain the inner surface of said second tubular coil essentially dry, the pressure in said second tubular coil ranging from about 20 to about 650 psig and the total surface area of said second tubular coil ranging from about 200 square feet to about 15,000 square feet.

2. The process of claim 1 wherein water is introduced into said first tubular coil at an inlet rate of 5,000 pounds per hour.

3. The process of claim 2 wherein said water is introduced into said first tubular coil at a temperature ranging from about 280° to about 550° F.

4. The process of claim 1 wherein the steam is introduced into said second tubular coil at a rate of 5,000 pounds per hour.

5. The process of claim 1 wherein the water introduced into the steam effluent of first tubular coil is in an amount sufficient to control the temperature of said fluidized bed.

* * * * *